3,404,271
METHOD FOR INSPECTING SEMICONDUC-
TOR DEVICES USING ELECTRON MIRROR
MICROSCOPY
Kurt Lehovec and Hans Schier, Williamstown, Mass., assignors to Sprague Electric Company, North Adams, Mass., a corporation of Massachusetts
No Drawing. Filed Nov. 2, 1966, Ser. No. 591,448
13 Claims. (Cl. 250—49.5)

This invention relates to a method for inspecting semiconductor devices and more particularly to a method of inspecting semiconductor devices by means of electron mirror microscopy.

In the manufacturing of semiconductor devices, reliability and cost factors demand exceptional quality control at various phases of construction. In the present state of the art, however, inspection is generally limited in the early production stages to optical methods which are relatively ineffective, since they fail to directly reveal faulty electrical behavior of the device.

It is an object of this invention to provide a method for inspecting the electrical quality of semiconductor devices by means of electron mirror microscopy.

It is another object of this invention to provide a method for inspecting semiconductor devices under energized conditions by means of electron mirror microscopy.

It is a further object of this invention to provide a non-destructive method for testing semiconductor devices in which impurity concentrations are investigated by means of their photovoltaic effect.

These and other objects of the invention will be more apparent from the following description.

Briefly the process for inspection of semiconductor devices, in accordance with the invention, includes the steps of: directing electrons toward a surface of the device which is suitably biased so as to reflect the electrons in front of its surface; energizing the device so as to provide electrical potential variations on the surface; and ascertaining the distribution of the reflected electrons to determine the electrical characteristics of the device.

In one embodiment of the invention, energizing of the semiconductor slice is provided by exposure of the surface to electromagnetic radiation of suitable wavelength as to create electron-hole pairs in the semiconductor. The whole surface or any portion of it may be illuminated in this way. Selected portions may be consecutively illuminated, for example, by a scanning spot or line swept across the device. In a somewhat similar manner, portions of the device may also be energized by focused beams of electrons.

The image resulting from an energized sample may be compared with an image of the same sample with or without energization, or to the image of an energized standard. A pulsing of the energizing means may also be employed to allow observation of charging or discharging of areas of the sample.

As indicated, the method utilizes electron mirror microscopy in which electrons coming from a point source are reflected in front of a slightly negatively biased sample and allowed to form an image on a fluorescent screen. The image formed is related to the potential distribution of the sample surface which is determined by the work functions and bias of parts of the surface, as well as the impurity gradients along the sample surface, as for example, p-n junctions.

Generally a simple electron gun, providing a point source of electrons, is utilized to direct an electron beam towards the sample which has a small negative bias (typically —½ to —2 volts) with respect to the cathode. The electrons are reflected in front of the sample surface and form an image of the target on a a fluorescent screen. This image may be observed visually or can be photographed An electro-optical lens system is incorporated with a gun to provide a suitable image magnification.

The shape of the electron trajectories, which provide the resultant image, are influenced by microfields in front of the sample, resulting from potential differences at the sample surface. These differences can, in turn, depend upon impurity variations and the photo-voltaic effect on, or within the sample surface.

In a preferred method of the invention, a sample target is placed in position and oriented to have a surface, or a substantially planar portion of it, generally perpendicular to the incoming electron beam. Thereafter the image of the sample is viewed, or photographed, or the like, to determine the potential distribution of the non-energized surface area under investigation. The sample is then energized to alter, or create, voltage differences across existing impurity gradients, such as P-N junctions or the like; and the distribution of the reflected electron beam is again determined. Thereafter the images of the non-energized and the energized surface are compared to determine the characteristics of the sample.

Various means may be employed to satisfactorily energize the sample, for example, illumination by light of a suitable wavelength, such as from .5 to 1.1 micron for silicon, will provide photovoltaic effects which result in a difference in charge across the impurity gradients of the sample.

The energized image reveals, among others, differences of impurity concentrations in adjacent portions of the sample surface. The deliberately formed impurity gradients can be inspected, and undesirable variations of impurity concentrations detected.

This observation of the image under stationary illumination of the sample is quite useful, however, the sensitivity of inspection can be further enhanced by switching the illumination on and off at a slow rate so as to cause a fluctuation of image details, or what may be called a "breathing" of the image, which easily shows up various flaws and irregularities. The indicated intermittent use of the energizing means, e.g. suitable infrared light in the case of silicon, may also be utilized to provide additional electrical information by observing the build up or decay rates of the photo-voltaic charges.

Many different arrangements are possible, of course. Thus, the whole surface area of the sample, or preferred parts of it, may be illuminated simultaneously; or the illumination may be swept across the surface as a scanning spot or line to allow the operator to investigate each area at a given time.

The generation of potential charges between adjacent areas of different impurity concentrations under energizing illumination arises as follows: an electric field already exists across an impurity gradient without any illumination due to the diffusion of electrons and holes from regions of high concentrations to those of low concentrations. Energizing illumination creates electron-hole pairs which are separated across the impurity gradient by this field, thus providing a voltage difference which, in turn, causes a return current to flow.

The magnitude of the voltage difference produced by the illumination is dependant upon the intensity of the illumination, the impurity gradient and the electrical resistance of the impurity gradient. The latter also governs the return current flow.

Consequently, this method of inspection of voltage differences is able to reveal impurity gradients of abnormally low resistance, such as caused by structural faults, internal shorts, etc.

Other means of energizing the sample are also suitable, thus an electron beam rather than infrared light may be employed. In this case a focused electron beam, in addition to the main beam used for the reflected image, is directed toward a portion of the sample to energize that portion, without physical contact, thereby providing a charging of that area. In this way, both negative and positive charges can be provided, since low energy electrons (typically less than 20 volts) will provide a negative charge; whereas positive charges can be obtained by high-energy electrons (typically 20 to 100 volts) impinging on a surface having a coefficient of secondary electron emission greater than unity.

It should be understood, however, that an electron beam of sufficient magnitude will, or can, cause some disturbance in the electron mirror field, thereby causing a disturbance of the image distribution. This can be avoided by focusing a narrow energizing beam on the sample at a discrete distance from the area under inspection, so that any reflected electrons from the energizing or secondary beam will not interfere with the reflected image forming electrons of the microscope.

Similarly, high secondary emission from target areas may also result in a blurring of the image since these electrons, having random trajectories, are not in alignment with the image forming electrons of the primary source. Both types of image distortion can be avoided in many cases, however, by suitable intermittent alternating use of the energizing source and the screen of the electron mirror microscope; that is the energizing beam may be triggered and then shut off while the mirror image is formed.

In this arrangement, since the image forming beam is operable only during the off intervals of the energizing source, interference will be minimized. It should be noted that intermittent operation will also allow investigation of electrical transient characteristics; that is the build up and decay of electrical charge due to the energizing means.

For satisfactory operation, a clean semiconductor surface is preferred for use with this method since any surface coating tends to alter the electrical charge of the surface, and thus interfere with the observed electrical characteristics of the device. For example, the protective oxide coating, such as silicon oxide or nitrides or the like, normally used for planar silicon devices can have this effect. However, this may be avoided by applying a sufficient negative bias to the oxide, so as to cause complete reflection of the image forming electrons before they reach it.

The latter will then allow inspection of exposed areas, which are surrounded by oxide coatings. Areas, for example, as are normally provided before diffusion or depositing of contacts in the planar process. In this case, the observable potential differences are between the area and the surrounding coating, since any junctions are generally hidden outside the open area.

The indicated charging of the insulating coating may also be prevented by making it conductive. For example, the surface of the coating may be rendered conductive before the openings are provided to the silicon surface. In this way, charge buildup on the oxide will be prevented, and yet, the exposed areas will be insulated from the conductive surface at the edge of the area, such that photovoltages between the exposed area and coating will not be shorted out.

Similarly, the coating may also be rendered slightly conductive, as for example, in the order of 100 to 10,000 megohms per square. In which case, further insulation between the coating and open areas is unnecessary since the low conductivity permits the existence of photovoltages between them.

The coating may, in any case, be suitably biased to make the open areas either negative or positive with respect to the coating, and as in the case of exposed junctions, internally shorted or low resistance pockets will be evident.

Accordingly, nondestructive testing of semi-conductive devices, such as diodes, transistors, micro-circuits and the like, may be carried out in early stages of production without physical connection to the circuit and without any undue disturbance, or contamination, of the sample surface. Advantageously, the method indicates not only deliberately formed concentrations and impurity gradients such as P-N and n-n+ junctions, and the like, but also any other accidentally created impurity gradients or flaws which may be in existence.

Many different modifiications of the method are possible of course. For example, the photovoltaic build up or decay arising at impurity gradients may be investigated and compared to the steady state energized or non-energized sample. Comparison between areas of the same slice may be utilized, as well as comparison with devices whose characteristics have been previously determined by conventional electrical means. Other means of energizing the sample may also be available. Thus, many different modifications are possible without departing from the spirit and scope of the invention herein and it is not to be limited except as in the appended claims.

What is claimed is:

1. A process for nondestructive inspection of semi-conductor devices by means of electron mirror microscopy comprising the steps of directing a beam of electrons towards a surface of said device which is biased slightly negative with respect to the source of said electrons so as to reflect them in front of said surface and provide an image thereof, energizing said surface by exposing said surface to radiation so as to produce electrical potential variations thereon, and ascertaining the electron distribution of said reflected electrons to determine the electrical characteristics of said device.

2. A process as claimed in claim 1 including the step of comparing said electron distribution under energized conditions to the electron distribution under non-energized conditions.

3. A process as claimed in claim 1 wherein only selected portions of the surface are energized.

4. A process as claimed in claim 1 wherein said energizing is accomplished by sweeping a radiation beam across said sample so as to selectively energize portions thereof.

5. A process as claimed in claim 1 including intermittent operation of said energizing to provide transient characteristics.

6. A process as claimed in claim 1 including the intermittent and alternate operation of said image forming step and said energizing step to minimize interference between them.

7. A process as claimed in claim 1 wherein said potential variation is provided across an impurity gradient of said surface.

8. A process as claimed in claim 1 including the steps of making an opening in an insulative coating of said device to expose an area of said surface, and rendering said coating slightly conductive.

9. A process as claimed in claim 1 including the steps of making an opening in an insulative coating of said device to expose an area of said surface, and rendering the upper surface of said coating substantially conductive.

10. A process as claimed in claim 1 wherein said potential variation is provided between an exposed area of said surface and a surface coating of said device.

11. A process as claimed in claim 1 wherein said energizing is provided by an additional electron beam which is made to impinge on said device.

12. A process as claimed in claim 1 wherein said energizing produces said potential variations by means of photovoltiac effects.

13. A process as claimed in claim 12 wherein said energizing is provided by illuminating said device with electromagnetic radiation which is designed to produce said photovoltaic effects.

References Cited
UNITED STATES PATENTS

| | | | |
|---|---|---|---|
| 2,901,627 | 8/1959 | Wiskott et al. | 250—49.5 |
| 3,047,719 | 7/1962 | Mayer | 250—49.5 |

WILLIAM F. LINDQUIST, *Primary Examiner.*